June 4, 1929.    R. GLINKA    1,715,830
AERATION PROCESS FOR DRYING, CARBONIZING, AND OXIDIZING PLANTS AND APPARATUS THEREFOR
Filed Oct. 13, 1927    4 Sheets-Sheet 1

Inventor:
Robert Glinka

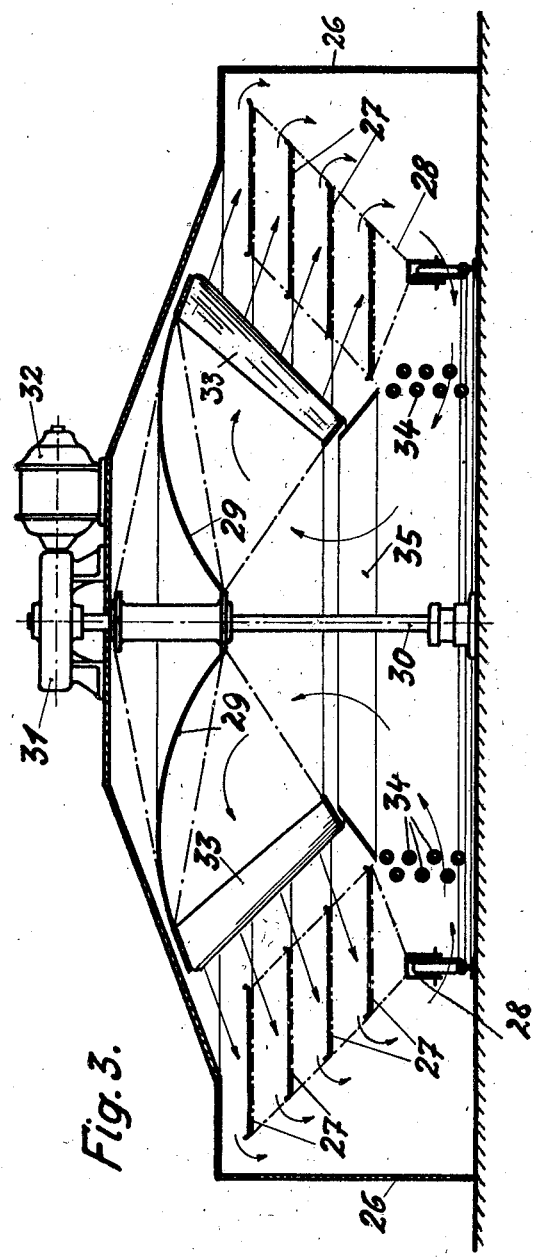

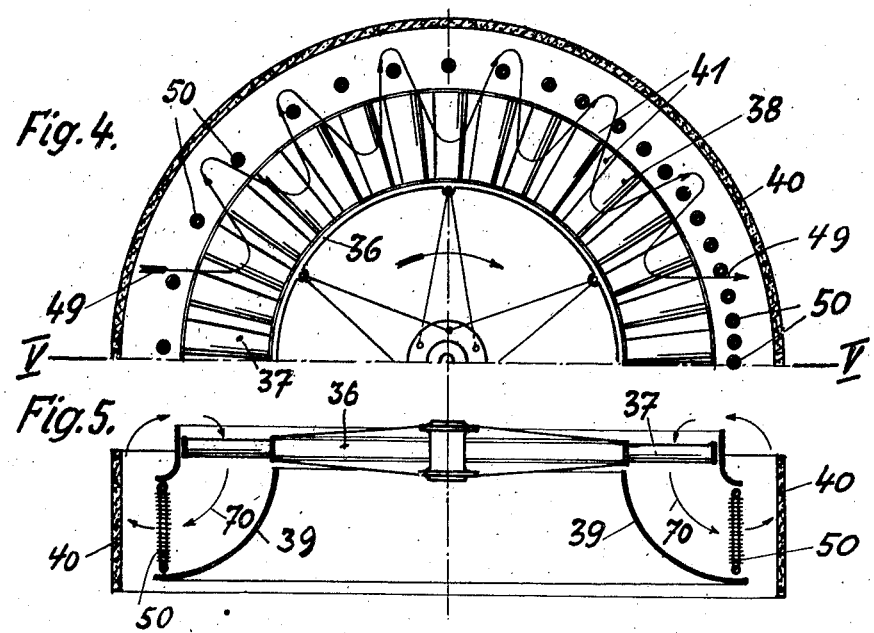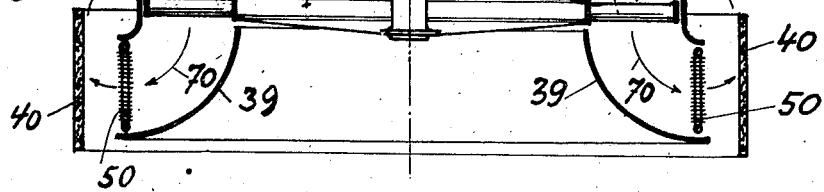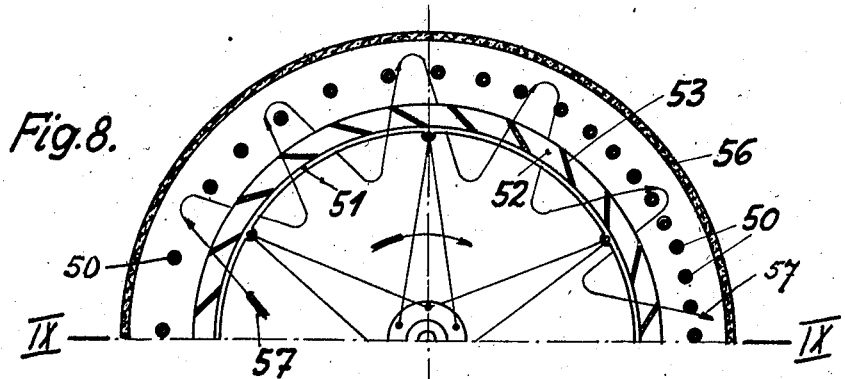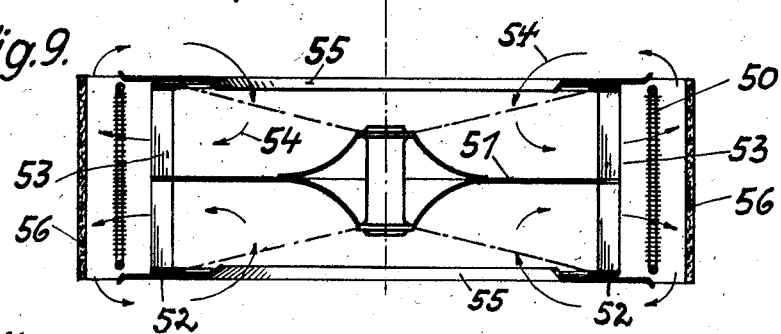

June 4, 1929.　　　　R. GLINKA　　　　1,715,830
AERATION PROCESS FOR DRYING, CARBONIZING, AND
OXIDIZING PLANTS AND APPARATUS THEREFOR
Filed Oct. 13, 1927　　　4 Sheets-Sheet 4

Patented June 4, 1929.

1,715,830

UNITED STATES PATENT OFFICE.

ROBERT GLINKA, OF MULHEIM-RUHR-SPELDORF, GERMANY.

AERATION PROCESS FOR DRYING, CARBONIZING, AND OXIDIZING PLANTS AND APPARATUS THEREFOR.

Application filed October 13, 1927, Serial No. 225,961, and in Germany October 18, 1926.

The drying by aeration of wet material of any kind requires a rather extensive display of the latter for attaining a large evaporation surface. The drying can be considerably accelerated by leading the drying air as vertically as possible toward the evaporation surface because by the bounding or dashing admission of the air thereto a whirling, quickly changing air playing upon the wet material is attained and the drying air penetrates into the pores of the latter.

Drying plants working on said principles, are, inter alia, known as one-ribbon driers.

All of them show an extent of the material over a large surface that is aerated by an uncomparatively large number of individual fans, which, of course, produce single air currents only of which a uniform distribution over the whole surface to be dried meets difficulties.

Said drawbacks are overcome, accordingly to the present invention, by locating the material to be dried in annular fashion about a vertical or horizintal axis and effecting the aeration by means of fans moving the drying air radially toward the material to be dried, that is located in the ring construction.

By the radial discharge or deflection of the drying air issuing from the fan, a perfectly uniform admission thereof to the evaporation surface is attained with the aid of one fan only, if, for instance, a freely ejecting fan with axially located vane rim is arranged within the ring construction, or a fan with a vane rim lying at right angles to the turning-axis is employed therein, from which the drying air issues axially and receives a radial motion by suitable guiding plates.

The improved aeration process can be used in connection with drying, carbonization and oxidation plants, provided that the material to be treated is located therein in annular fashion.

The accompanying drawings show, by way of example, how the invention can be put into practice:—

Fig. 3 is a vertical central section through a modified construction of a drying plant;

Fig. 4 is an end view of one-half of a fan with a vane rim located at right angles to the turning-axis, and Fig. 5 is a longitudinal section on the line V—V of Fig. 4;

Fig. 6 is a cross-section, on a larger scale, through one vane of said fan, and

Figure 1:
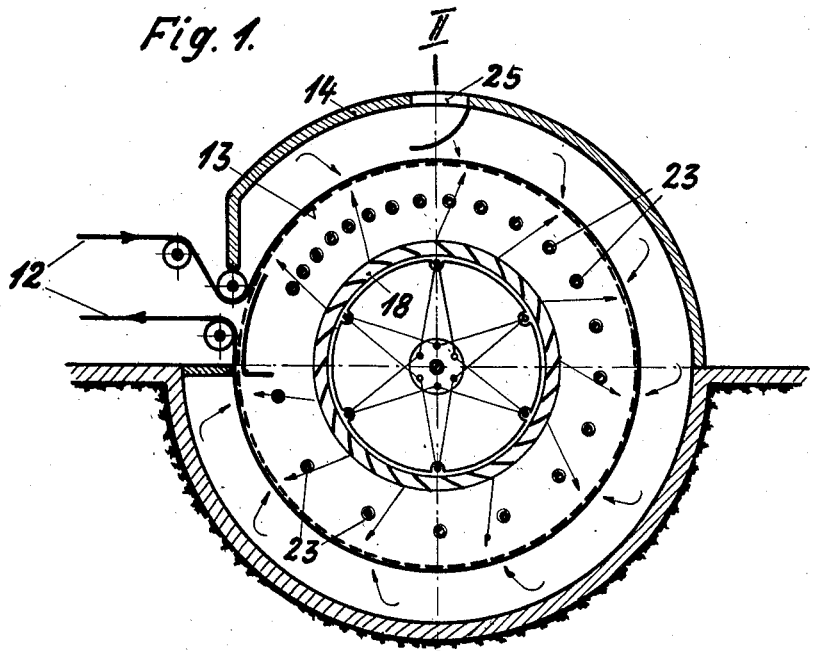
Fig. 1 is a cross-section.
Figure 2:
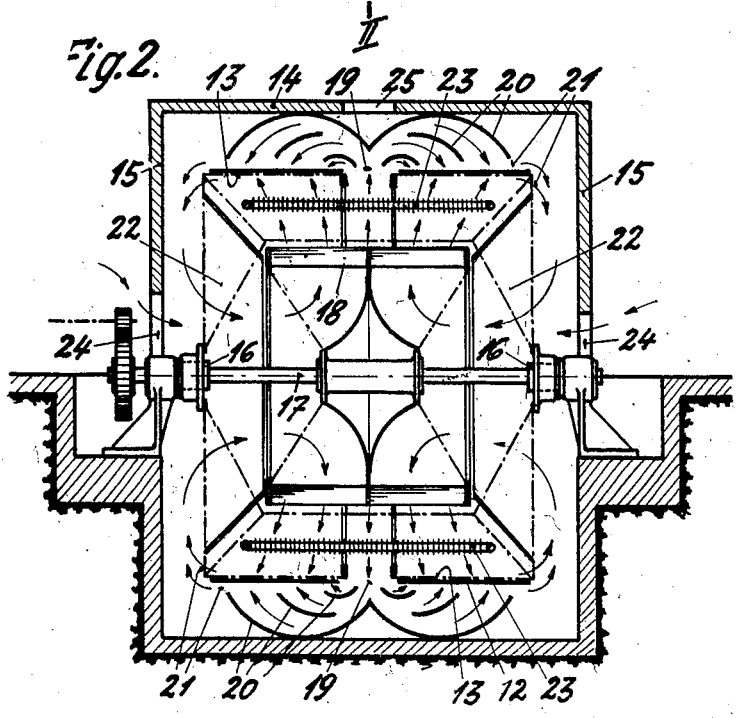
Fig. 2 is a longitudinal section, on the line II—II of Fig. 1, through a preferred form of an improved drying plant embodying the invention.

Fig. 7 is a cross-section through a vane of somewhat modified formation;

Fig. 8 is a cross-section through one-half of a fan with an axially located vane rim, and Fig. 9 is a longitudinal section on the line IX—IX of Fig. 8;

Referring to Figs. 1 and 2:—

The ribbonlike wet material 12 to be dried is taken-up by the air-permeable drum 13, that is revolubly arranged by means of its trunnions 16 within a chamber formed by the surrounding hood 14 with end walls 15. The fan 18 centrally arranged on the driven shaft 17 moves the drying air radially toward the wet material. The drum receiving the latter has in the middle on its whole circumference an opening 19 through which flows part of the drying air that is led by means of the guiding plates 20 toward the outer surface of the material to be dried. The ejected air after its play upon the surface to be dried returns through the apertures 21 again to the suction openings 22 of the fan. Said circulation is continuously repeated, the heating elements 23 annularly arranged around the fan serving for a permanent heat supply. The fresh-air is admitted through the openings 24 and the waste-air is led-off through the opening 25 arranged in the pressure centre of the outer hood 14.

Assuming, for instance, that the diameter of the drum amounts to 6 metres and its breadth to 4 metres, a surface of about 150 square metres could be perfectly well aerated by means of one single fan only. The want of power for such a centrally arranged large fan is decreased to a minimum, as is also the extent of the plant due to its annular construction and thus the expenditure for constructional material. Further savings can be made by an underground location of the lower half of the plant, as shown in the illustration.

The improved construction allows the arrangement of a plurality of such chambers behind each other. The material to be dried is then led from one drum to the other, and the drying air is conducted from one chamber to the other, for ensuring a stepwise drying.

Fig. 3 shows an annular drying plant, in which the material to be dried is horizontally located in superposed fashion, and in stepwise manner from the bottom to the top of the surrounding casing 26, on annular lattices 27 arranged upon a turnable ring construction 28 and around a vertical shaft 30 carrying the fan 29 and receiving its drive from a motor 32 through an intermediary worm gearing 31.

The vane rim 33 of the fan is adjusted at an angle suiting the surfaces 27 to be aerated, in such a way that the obliquely escaping air current is directly admitted to the latter. After its play upon the wet material the drying air flows below the ring construction 28 over heating elements 34 to the suction zone 35 of the fan and again circulates as just described.

For the improved aeration process, mostly, fans of large diameters are used. With a suitable construction of the same, a stepwise drying by air circulation can be attained.

If, for instance, as shown in Figs. 4 and 5, a fan 36 with a vane rim 37 lying at right angles to the turning-axis is used for the air motion, the vanes 38 are made as short as possible, so that the fan receives a narrow vane rim 37 only, which when turned moves an air layer corresponding thereto. A guiding plate 39 serves to deflect the axially escaping drying air into a radial direction toward the surface of the material 40 to be dried.

A consideration of the air motion through the channels 41 of the vane rim shows that an axial inflow and outflow of the air is attained if, as shown in Fig. 6, the vanes 42 are adjusted just at an acute angle to the air to be acted upon while care is taken that the vane inclination corresponds to the hypotenuse 43 of the graphically plotted and predetermined velocity of flow 44 and circumferential speed 45; the arrow 46 indicating the direction of movement of the vane.

If, as shown in Fig. 7, the rear end 47 of the vane is bent up, the speed and direction of the incoming air 44 are correspondingly changed to a direction 48 lying more or less oblique to the fan axis.

Thereby, the continuously circulating air indicated by arrow 70 (Fig. 5) is brought into a spirally proceeding motion indicated by the arrow line 49 (Fig. 4), thus suiting the air change necessary in such a chamber, that is, the fresh-air admission and the waste-air escape.

If, furthermore, the heating elements 50 inserted in the path of the air circulation are made of different heating surfaces, the air is allowed to take-up at any part of the chamber a temperature corresponding to said different heating surfaces.

The same effect can be attained with the double-acting fan 51 having an axially arranged vane rim 52 by fitting the same with short vanes 53 at its circumference only.

The air entering the suction zone 55 of the fan, moves, as indicated by the arrows 54, radially, that is, vertically toward the vane rim 52 and the material 56 to be dried whence it returns again to the suction zone of the fan.

With a consideration of the air motion through the channels of the vane rim 52 of the fan of rather large diameter, the same result is obtained as with the fan shown in Fig. 4. A similar spirally proceeding air motion indicated by the arrow line 57 is attained.

Figure 10:
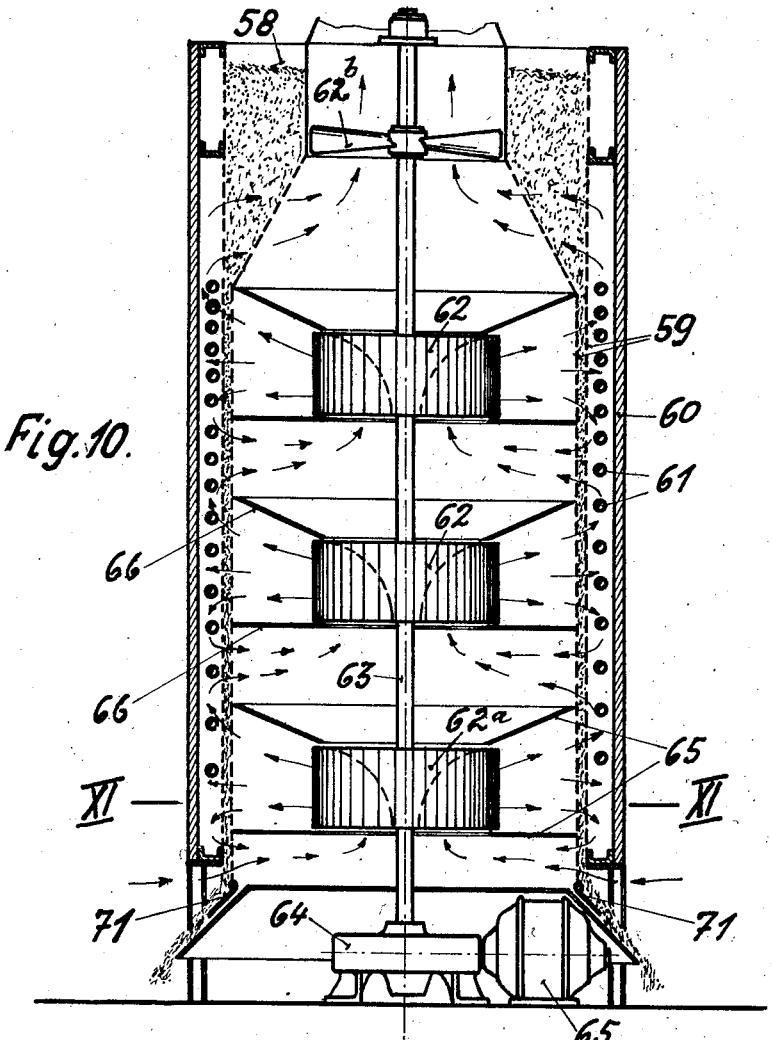
Fig. 10 is a vertical central section through a drying plant, through the ring construction of which the wet material to be dried travels in axial direction.
Figure 11:
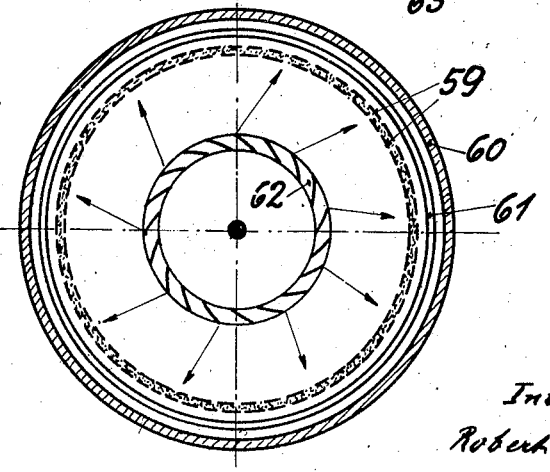
Fig. 11 is a cross-section on the line XI—XI of Fig. 10.

Figs. 10 and 11 show a drying plant for wet material travelling through the ring construction of the same in axial and downward direction from the charging hopper 58 through the double-walled annular shaft 59 of perforated sheet metal, at the bottom of which control flaps 71 are arranged through which the material is let off. The shaft 59 is enclosed by an outer casing 60 while heating elements 61 are interposed between shaft and casing. Centrally within the annular shaft 59 a plurality of superposed fans 62 are arranged on a common axle 63 driven from the motor 65 by means of a gearing 64. Guiding plates 66 bound the suction and pressure zones of the individual fans and effect that the drying air set in motion by the latter flows through the wet material in alternate radial directions.

For attaining a stepwise drying, part of the air ejected by each fan is conducted into the suction zone of the next following fan. The fresh air quantity entering at the lowermost fan 62$^a$ changes from one fan to the other each time with a heat reception from the heating elements 61 having a heating surface increasing in the direction of movement of the air, until it arrives in water-saturated condition at the uppermost fan 62$^b$ where it is ejected. The motion of the fresh air is effected by the equalization of the excess pressure produced by the fresh air entrance at one end and of the vacuum produced by the ejection of the waste air at the other end of the drying chamber.

What I claim, is:—

1. A method of drying, carbonizing and oxidizing any material consisting in making the material move around a central axis while blowing the drying air radially from said axis towards said material, in conducting the radial air currents through gaps in the ring-shaped material, and in then deflecting said air currents to make them flow along the outer surface of the material.

2. An apparatus for aerating material in drying, carbonization and oxidation plants, comprising in combination a ring construction for carrying the material having gaps at certain points, a cylindrical envelope enclosing said ring construction, end plates closing the ends of said cylindrical envelope so that these three elements together form a closed chamber, fans at the center of said closed chamber for producing radial air currents, and deflecting plates between said envelope and ring construction opposite the gaps of the latter to deflect the radial air currents to make them flow along the outer surface of the material on said ring construction and to return said air currents to said fans.

3. In an apparatus as specified in claim 2 centrally arranged fans comprising an axially arranged rim of vanes.

4. In an apparatus as specified in claim 2, centrally arranged fans comprising an axially arranged rim of vanes said vanes adapted to be adjusted at an angle to the surface to be aerated.

5. In an apparatus as specified in claim 2, helical centrally arranged fans with ring shaped rim of vanes.

In testimony whereof I have hereunto set my hand.

ROBERT GLINKA.